United States Patent [19]
Grill et al.

[11] Patent Number: 6,035,895
[45] Date of Patent: Mar. 14, 2000

[54] THREE-WAY LATCHING FLUID VALVE

[75] Inventors: Benjamin Grill; Oded E. Sturman, both of Woodland Park, Colo.

[73] Assignee: Sturman BG, LLC, Woodland Park, Colo.

[21] Appl. No.: 09/013,801

[22] Filed: Jan. 26, 1998

[51] Int. Cl.[7] .................................................. F15B 13/044
[52] U.S. Cl. .............................. 137/625.65; 251/129.07; 251/129.1; 251/126.16; 251/129.17
[58] Field of Search ......................... 137/625.27, 625.65; 251/129.07, 129.1, 129.16, 129.17

[56] References Cited

U.S. PATENT DOCUMENTS

| | | |
|---|---|---|
| 3,683,239 | 8/1972 | Sturman . |
| 3,743,898 | 7/1973 | Sturman . |
| 4,409,638 | 10/1983 | Sturman et al. . |
| 4,857,842 | 8/1989 | Sturman et al. . |
| 4,870,892 | 10/1989 | Thomsen et al. . |
| 5,598,871 | 2/1997 | Sturman et al. . |
| 5,720,261 | 2/1998 | Sturman et al. . |

FOREIGN PATENT DOCUMENTS

| | | |
|---|---|---|
| 1 550 322 | 1/1969 | Germany . |
| 1 550 632 | 1/1970 | Germany . |
| 1 475 930 | 10/1970 | Germany . |
| 1526630 | 9/1978 | United Kingdom . |

OTHER PUBLICATIONS

Machine Design, Feb. 21, 1994, "Breakthrough in Digital Valves", Carol Sturman, Eddie Sturman.

SAE Technical Paper Series, 1999–01–0825, "Digital Valve Technology Applied to the Control of an Hydraulic Valve Actuator", Kathleen M. Misovec et al., Mar. 1–4, 1999.

"Application of Unified Predicitive Control to On/Off Control of Hydraulic System Driven by Fast–Switching Solenoid Valves," Carlos E, Jeronymo et al., Series C, vol. 39, No. 3, 1996.

SAE Technical Paper Series "Adaptive Lift Control for a Camless Electrohydraulic Valvetrain," Mark D. Anderson et al., Feb. 23–26, 1998.

"Advanced Control System Design", Bernard Friedland, 1996 by Prentice–Hall, Inc.

"Applied Optimal Control, Optimization, Estimation, and Control," Arthur E. Bryson, Jr. et al., Hemisphere Publishing Corporation, 1975.

"Development in Digital Valve Technology," by Rob Wilson, reprint, Diesel Progress North American Edition, Apr. 1997.

"The Swing to Cleaner, Smarter, Hydraulics," by Stuart Brown, excerpt, pp. 152(A)(F)(J)(K), Fortune Magazine, Jun. 9, 1997.

"Vickers Taking Closer Aim at Mobile Markets," by Mike Brezonick, reprint, Diesel Progress North American Edition, Aug. 1977.

*Primary Examiner*—Gerald A. Michalsky
*Attorney, Agent, or Firm*—Blakely Sokoloff Taylor & Zafman

[57] ABSTRACT

A latching, dynamically balanced, fluid control valve. The valve includes a housing which has a supply port, a cylinder port and a return port. Fluid communication between the supply port and the cylinder port is controlled by a first valve that opens and closes against first valve seat of the housing. Fluid communication between the supply port and the return port is controlled by a second valve that opens and closes against a second valve seat. The valves are connected to a transfer tube that is coupled to a pair of solenoids. The solenoids can be actuated to move the tube and valves between a first position, which allows fluid communication between the supply port and the cylinder port, and a second position that allows fluid communication between the supply port and the return port. The solenoids are actuated by short digital pulses that latch the transfer tube and valves into either the first or second position. Each solenoid is sealed by a seal that has an effective area which is approximately equal to the area of the valve seats. Each seal is located oppositely from a valve seat so that opposing fluid pressures are applied to the seal and the seat washer. The opposing pressures create a net force on the transfer tube that is approximately zero.

4 Claims, 2 Drawing Sheets

THREE-WAY LATCHING FLUID VALVE

BACKGROUND OF THE INVENTION

1. Field of the Invention

The present invention relates to a latching, dynamically balanced, three-way fluid control valve.

2. Description of Related Art

Insecticides are commonly distributed onto a field by a sprinkler system that is mounted to a truck. The sprinkler system has a plurality of spray nozzles that are coupled to a source of pressurized insecticide. The fluid is typically sprayed from both sides of the vehicle to maximize the spray radius of the system. When moving along the perimeter of a field it is not always desirable to spray from both sides of the truck. For this reason, it is desirable to provide a number of control valves that allow the operator to control the flow of fluid from the nozzles.

Fluid control valves typically contain a spool that controls the flow of fluid between a number of ports located in the valve housing. The flow of fluid between the ports is determined by the position of the spool. By way of example, in a three-way valve, when the spool is in one position a supply port is in fluid communication with an outlet port. When the spool is in a second position the cylinder port is in fluid communication with a return port. The position of the spool is typically controlled by a solenoid(s).

The spools have a number of channels or grooves that align the ports of the valve housing. The channels are relatively narrow and are susceptible to clogging, particularly when used in an agricultural environment that has a relatively large amount of dirt and dust. Additionally, the narrow channels produce a relatively large pressure drop across the valve. It would be desirable to provide a three-way fluid control valve that is not susceptible to clogging and does not produce a significant pressure drop across the valve.

Solenoid controlled fluid valves typically require a continuous supply of power to actuate the solenoids. The requirement for continuous power increases the power supply and energy consumption of the system. Additionally, spool valves are dynamically unbalanced such that the solenoids must overcome the pressure of the working fluid to move the spool. The additional work required to overcome the fluid pressure consumes more power and reduces the energy efficiency of the system. Therefore it would be desirable to provide a solenoid actuated three-way control valve that is dynamically balanced, is not susceptible to clogging, does not produce significant pressure drops, and can be actuated without a continuous supply of power.

SUMMARY OF THE INVENTION

The present invention is a latching, dynamically balanced, fluid control valve. The valve includes a housing which has a supply port, a cylinder port and a return port. Fluid communication between the supply port and the cylinder port is controlled by a first valve that opens and closes against a first valve seat of the housing. Fluid communication between the cylinder port and the return port is controlled by a second valve that opens and closes against a second valve seat. The valves and ports provide relatively large valve openings that are not susceptible to clogging and do not produce significant pressure drops in the valve.

The first and second valves are connected to a transfer tube that is coupled to a pair of solenoids. The solenoids can be actuated to move the tube and the valves between a first position, which allows fluid communication between the supply port and the cylinder port, and a second position that allows fluid communication between the supply port and the return port. The solenoids are actuated by short digital pulses that latch the transfer tube and valves into either the first or second position. Each solenoid is sealed by a seal that has an effective area which is approximately equal to the area of the valve seats. Each seal is located oppositely from a valve seat so that opposing fluid pressures are applied to the seal and the seat washer. The opposing pressures create a net force on the transfer tube that is approximately zero.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
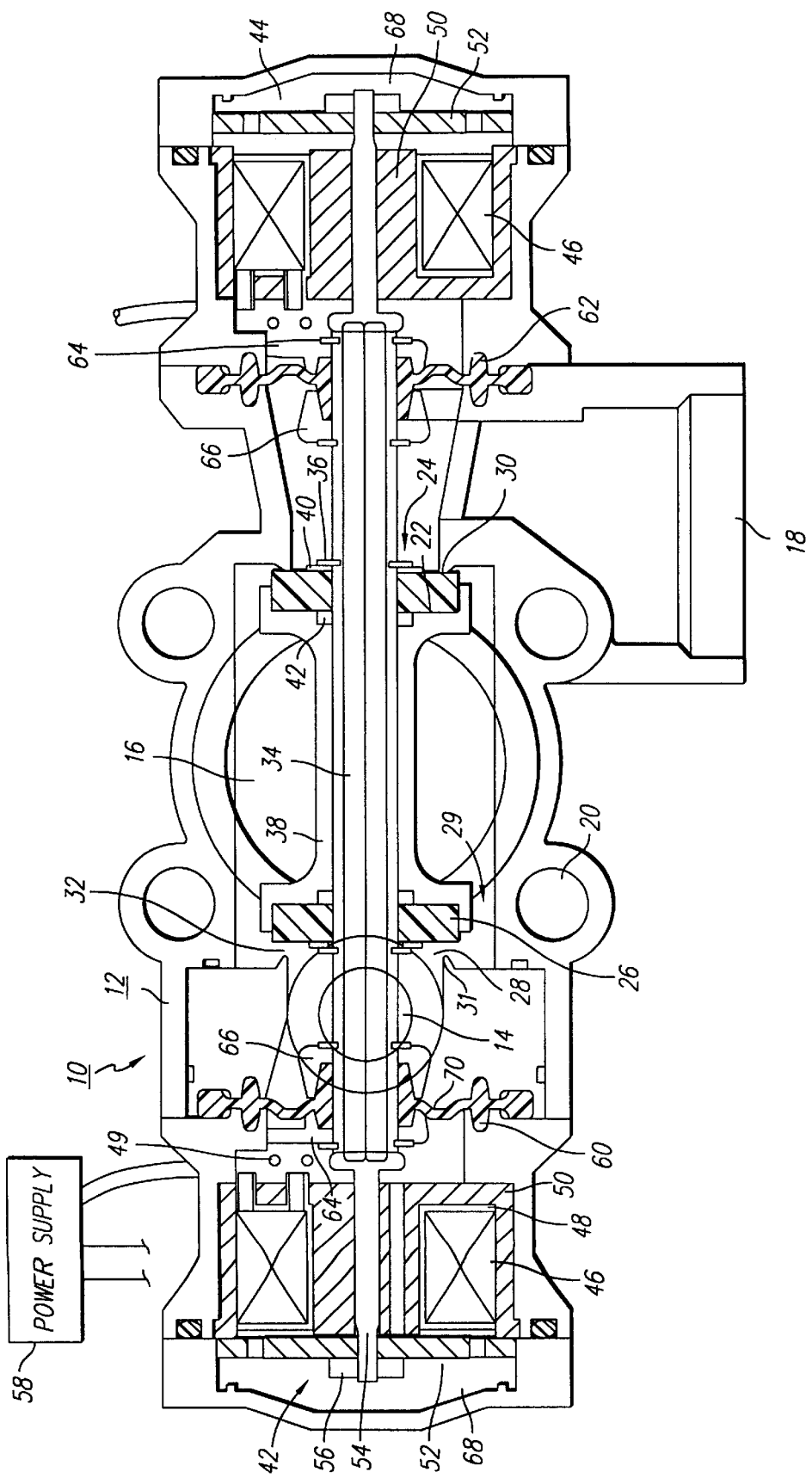
FIG. 1 is a cross-sectional view of a fluid control valve of the present invention with the valve in a first position.

Referring to the drawings more particularly by reference numbers, FIG. 1 shows a fluid control valve 10 of the present invention. The control valve 10 is used to control the flow of fluid in a fluid system. By way of example, the fluid system may be a sprinkler system that sprays insecticide from a moving vehicle. The valve 10 has a housing 12 which contains a supply port 14, a cylinder port 16 and a return port 18. The supply port 14 may be connected to a supply of fluid such as an insecticide. The cylinder port 16 may be connected to an output device such as a spray nozzle of a sprinkler system. The return port 18 may be coupled to a reservoir, or the input port of a pump. The housing 12 is preferably constructed from a plastic material such as polypropylene that is resistant to chemicals such as insecticides. The plastic material may be reinforced with 15% glass to increase the strength of the housing 12. The housing 12 may have mounting holes 20 to allow the valve 10 to be mounted to a substrate (not shown).

The valve 10 has a first valve 22 located adjacent to a first valve seat 24 and a second valve 26 located adjacent to a second valve seat 28. The first valve 22 controls the flow of a working fluid 29 through the first seat 24. The second seat washer 26 controls the flow of the working fluid 29 through the second seat 28. The valves 22 and 26 cooperate with valve seats 30 and 31 to close the ports 24 and 28. When in the open position the valves are separated from the seats by an annular gap 32. The annular gaps 32 provide a relatively large flow area which minimizes the pressure drop across the valve and provides a valve assembly that is less susceptible to clogging. In the preferred embodiment, the valves 22 and 26 have a diameter of approximately 0.85 inches and are separated from the seats by a space 0.165 inches wide.

The valves 22 and 26 are attached to a transfer tube 34 that extends through the housing 12. The valve 10 has a pair of clips 36 that press the valves into a valve support member 38. The valves 22 and 26 may be further secured by a pair of washers 40 and a pair of O-rings 41 that seal the assembly. When a plastic housing is used, it is preferable to use plastic washers to minimize the wear on the valve components.

The transfer tube 34 is coupled to a first solenoid 42 and a second solenoid 44. When the first solenoid 42 is actuated the transfer tube 34 moves to a first position. In the first position the first valve 22 is pressed against the first valve seat 30 to prevent fluid from flowing into the return port 18, and the second valve 26 is separated from the second seat 30 to allow fluid communication between the supply port 14 and the cylinder port 16. When the second solenoid 44 is actuated the transfer tube 34 moves to a second position. In the second position, the second valve 26 is pressed against the second valve seat 30 to prevent fluid flow from the supply port 14, and the first valve 22 is separated from the first valve seat 29 to allow fluid communication between the cylinder port 16 and the return port 18.

Each solenoid has a coil 46 that is wrapped around a bobbin 48. The coil wire may be routed through openings 49 in the housing 12. The bobbins 48 are mounted to a pair of magnetic poles 50. Each pole 50 is coupled to an armature 52. An armature 52 is pulled into contact with an adjacent pole 50 when the solenoid is actuated, and pushed away from the pole 50 when the opposite solenoid is actuated. The armatures 52 are screwed onto a pair of push rods 54 and secured by a pair of nuts 56. The push rods 54 are attached to the ends of the transfer tube 34.

The solenoids 42 and 44 receive power from a power supply 58. The power supply 58 provides digital pulses to the coils 46 to actuate the solenoids. The armatures 52 and poles 50 are preferably constructed from a magnetic steel material which has enough residual magnetism to maintain the armature 52 in contact with the pole 50 even when power to the coil 46 is terminated. The attractive residual magnetic forces allow the solenoids to be latched by digital signals. In the preferred embodiment, the armatures 52 and poles 50 are constructed from hardened 52100 or 440c steel. Latching the valve into position with digital pulses consumes less power than valves of the prior art which require a continuous supply of power to maintain the position of the valve.

The valve 10 further contains a first seal 60 that seals the first solenoid 42 and a second seal 62 that seals the second solenoid 44. The seals 60 and 62 are captured by the housing 12 and attached to the transfer tube 34 by a pair of support plates 64 and a pair of clamps 66. The housing 12 and seals 60 and 62 define a pair of solenoid chambers 68. The chambers 68 may contain a glycol based fluid that lubricates the armatures 52 and poles 50 and reduces the wear of the solenoid components.

The seals 60 and 62 each have an effective area 70 that is in fluid communication with the working fluid 30 of the valve. The area 70 is approximately equal to the area of the valve seats 24 and 28. Each seal area 70 is located opposite from a seat washer so that are opposing fluid pressure force on the seals and the washers. The opposing pressure forces create a net fluid force on the transfer tube 34 that is approximately zero. The zero net force dynamically balances the valve so that the solenoids do not have to generate work to overcome the fluid pressure when switching the tube 34 from one position to another position.

In operation, the power supply 58 provides a digital pulse to the first solenoid 42 to actuate the same. The energized first solenoid 42 pulls the armature 52 and moves the transfer tube 34 to the first position, so that the working fluid 29 flows from the supply port 14 to the cylinder port 16. Power to the first solenoid 42 is then terminated, wherein the hystersis of the pole and armature material maintain the transfer tube 34 in the first position.

Figure 2:
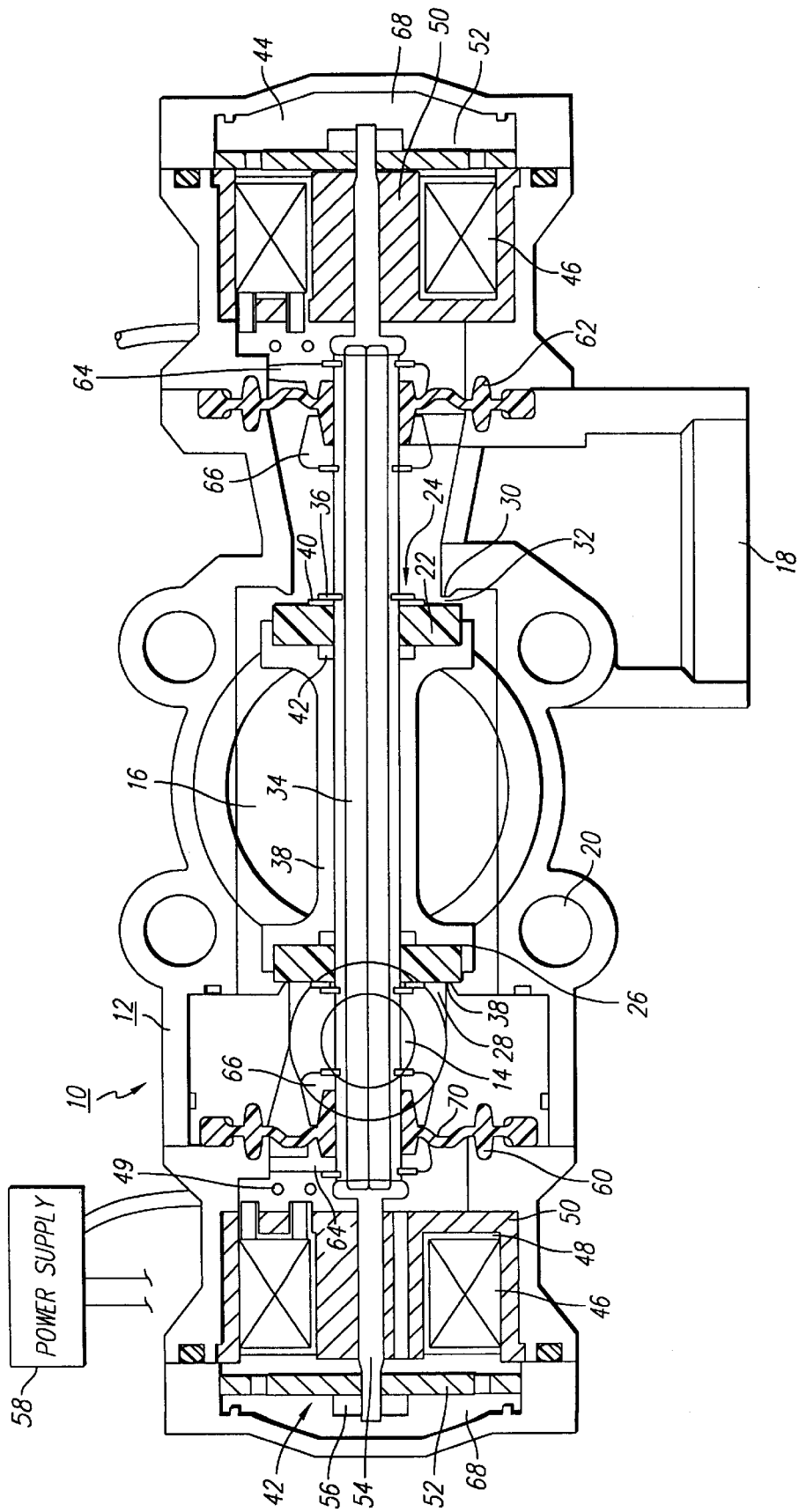
FIG. 2 is a cross-sectional view of the fluid control valve with the valve in a second position.

As shown in FIG. 2, to change the flow of the fluid, the power supply 58 provides a digital pulse to the second solenoid 44. The actuated second solenoid 44 moves the transfer tube 34 to the second position. In the second position, the working fluid 29 flows from the cylinder port 16 to the return port 18. Power to the second solenoid 44 is terminated and the process can be repeated by providing a digital pulse to the first solenoid 42. The present invention thus provides a latching, dynamically balanced, three-way control valve that has a lower pressure drop and is less susceptible to clogging than valves of the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A three-way fluid control valve that controls a flow of a working fluid, comprising:

a housing that has a supply port, a cylinder port and a return port, said housing further having a first valve seat that has a first seat area and a second valve seat that has a second seat area;

a transfer tube that extends through said housing;

a first valve that is attached to said transfer tube and located adjacent to said first valve seat;

a second valve that is attached to said transfer tube and located adjacent to said second valve seat;

a first solenoid that is adapted to receive current and move said transfer tube to a first position such that said first valve closes against said first valve seat and said second valve is open to allow fluid communication between said supply port and said cylinder port, said first solenoid being adapted to have a residual magnetism that retains said transfer tube in said first position when current is not being provided to said first solenoid;

a first seal that is attached to said transfer tube and which seals said first solenoid;

a second solenoid that is adapted to receive current and move said transfer tube to a second position such that said second valve closes against said second valve seat and said first valve is open to allow fluid communication between said cylinder port and said return port; and, a second seal that is attached to said transfer tube and which seals said second solenoid, said second solenoid being adapted to have a residual magnetism that retains said transfer tube in said second position when current is not provided to second solenoid.

2. The valve as recited in claim 1, further comprising a power supply that provides a plurality of digital pulses that latch said first solenoid and said transfer tube to the first position, and said second solenoid and said transfer tube to the second position.

3. The valve as recited in claim 2, wherein said housing is constructed from a plastic material.

4. The valve as recited in claim 1, wherein said first seal has an effective area approximately equal to said first seat area and said second seal has an effective area approximately equal to said second seat area.

\* \* \* \* \*